United States Patent
Gibson et al.

(10) Patent No.: US 10,029,430 B2
(45) Date of Patent: Jul. 24, 2018

(54) TRAY FOR USE IN MANUFACTURING CONTACT LENSES

(71) Applicant: CooperVision International Holding Company, LP, St. Michael (BB)

(72) Inventors: John Robert Gibson, Farnham Common (GB); Geoffrey Douglas Sydney Payne, Bolton (GB)

(73) Assignee: CooperVision International Holding Company, LP, St. Michael (BB)

(*) Notice: Subject to any disclaimer, the term of this patent is extended or adjusted under 35 U.S.C. 154(b) by 0 days.

(21) Appl. No.: 15/684,960

(22) Filed: Aug. 24, 2017

(65) Prior Publication Data

US 2017/0348927 A1 Dec. 7, 2017

Related U.S. Application Data

(63) Continuation of application No. PCT/GB2016/050996, filed on Apr. 11, 2016.

(30) Foreign Application Priority Data

Apr. 9, 2015 (GB) .................................. 1506031.2

(51) Int. Cl.
  *B29C 31/00* (2006.01)
  *B29D 11/00* (2006.01)
  *B29L 11/00* (2006.01)

(52) U.S. Cl.
  CPC ...... *B29D 11/00182* (2013.01); *B29C 31/006* (2013.01); *B29D 11/00134* (2013.01); *B29K 2877/00* (2013.01); *B29L 2011/0041* (2013.01)

(58) Field of Classification Search
  CPC ............ B29C 31/006; B29D 11/00134; B29D 11/00182
  See application file for complete search history.

(56) References Cited

U.S. PATENT DOCUMENTS

| 6,695,988 B1 | 2/2004 | Schlagel et al. | |
| 2009/0075054 A1* | 3/2009 | Hirata | C08J 5/04 428/307.7 |

(Continued)

FOREIGN PATENT DOCUMENTS

| WO | 0174575 A1 | 10/2001 |
| WO | 03082367 A2 | 10/2003 |

OTHER PUBLICATIONS

International Search Report and Written Opinion issued in corresponding International Patent Application No. PCT/GB2016/050996 dated Jun. 21, 2016 (12 pages).

*Primary Examiner* — James M Sanders
(74) *Attorney, Agent, or Firm* — Kilyk & Bowersox, P.L.L.C.

(57) ABSTRACT

A tray (20) for holding contact lens mold assemblies (70) during thermal curing of a contact lens precursor material in an oven (210) to form contact lenses. The tray (20) comprises a plurality of plates (60) and a frame (25) supporting the plates (60). The frame (25) is configured to be stacked vertically with a plurality of identical frames to form a tray stack (10). Each plate (60) is a carbon-fiber reinforced polymer plate and comprises a plurality of support structures (110) each arranged to support one contact lens mold assembly (70) during curing and a plurality of channels (90, 100) connecting the support structures (110), to allow gases to flow between them in the tray stack (10) during curing.

16 Claims, 6 Drawing Sheets

(56) References Cited

U.S. PATENT DOCUMENTS

2011/0062607 A1 3/2011 Clements et al.
2011/0259772 A1 10/2011 Forsyth et al.
2013/0118124 A1 5/2013 Cheah et al.

* cited by examiner

TRAY FOR USE IN MANUFACTURING CONTACT LENSES

This application is a continuation of International Patent Application No. PCT/GB2016/050996, filed Apr. 11, 2016, which claims priority to United Kingdom Patent Application No. 1506031.2, filed Apr. 9, 2015.

FIELD

This invention relates to the field of contact lens manufacture. In particular, but not exclusively, the invention provides a tray for use in manufacturing contact lenses.

BACKGROUND

Various methods of manufacturing contact lenses are known, including spin casting, lathing (for example by diamond turning), and cast molding (for example, using injection molded mold halves). Cast molding of contact lenses involves forming a pair of mold halves (i.e., a first mold half and a second mold half), placing a volume of a contact lens formulation on an optical quality surface of one of the two mold halves, and placing the two mold halves in contact with each other to form a contact lens mold assembly that has a contact lens-shaped cavity containing the contact lens formulation. The contact lens mold assembly is then exposed to conditions to cause the contact lens formulation to polymerize or cure in the contact lens mold assembly. Using cast molding processes on automated high speed manufacturing lines, contact lenses can be manufactured in large numbers, for example, tens of thousands of lenses each day. Increases in the rate of manufacture of contact lenses can be expected to bring down the cost of each lens. It is important, however, that increased rates of manufacture do not compromise the quality of the lenses produced.

One common method of curing the contact lens formulation is to heat the mold assembly in a curing oven. It is advantageous to provide a gas purge in the oven, to prevent oxygen in the air from interfering in the polymerization process; for example, a nitrogen atmosphere can be used. For successful polymerization, it is important that the contact lens formulation is heated rapidly. For example, polymerisation of silicone hydrogel contact lenses can be poor if the contact lens formulation is heated too slowly.

The desire to increase the rate of manufacture of contact lenses means that there is a need to increase the number of contact lens mold assemblies in curing ovens at any given time on a contact lens production line, whilst maintaining the correct manufacturing conditions for all of the mold assemblies.

SUMMARY

Briefly and in general terms, the present invention provides apparatus directed towards improving efficiency of lens manufacturing in approaches employing thermal curing of a contact lens precursor material in an oven to form contact lenses.

This invention provides, in a first aspect, a tray for holding contact lens mold assemblies during thermal curing of a contact lens precursor material in an oven to form contact lenses, wherein the tray comprises:
(a) a plurality of plates; and
(b) a frame supporting the plates, the frame being configured to co-operate with identical frames so that a plurality of the trays can be stacked vertically to form a tray stack;

wherein each plate comprises:
(i) a plurality of support structures each arranged to support one contact lens mold assembly during curing; and
(ii) a plurality of channels connecting the support structures, to allow fluid communication between the support structures in the tray stack during curing;
and wherein each plate is a carbon-fiber reinforced polymer plate.

The invention provides, in a second aspect, a stack of the trays according to the first aspect of the disclosure, including a plurality of the contact lens mold assemblies.

The invention provides, in a third aspect, a plate for use in a tray according to the first aspect, the plate being a carbon-fiber reinforced polymer plate and comprising:
(i) a plurality of support structures each arranged to support one contact lens mold assembly during curing; and
(ii) a plurality of channels connecting the support structures, to allow fluid communication between the support structures in the tray stack during curing.

It will be appreciated that features described in relation to one aspect of the present invention can be incorporated into other aspects of the present invention. For example, a plate of the third aspect can incorporate any of the features described with reference to the tray of the first aspect, and vice versa. Moreover, additional embodiments and aspects will be apparent from the following description, drawings, and claims. As can be appreciated from the foregoing and following description, each and every feature described herein, and each and every combination of two or more of such features, and each and every combination of one or more values defining a range, are included within the scope of the present disclosure provided that the features included in such a combination are not mutually inconsistent. In addition, any feature or combination of features or any value(s) defining a range may be specifically excluded from any embodiment of the present disclosure.

BRIEF DESCRIPTION OF THE DRAWINGS

Examples of the trays, stacks and plates of the present invention will now be described, by way of example only, with reference to the accompanying drawings, in which.

DETAILED DESCRIPTION

Figure 1A:
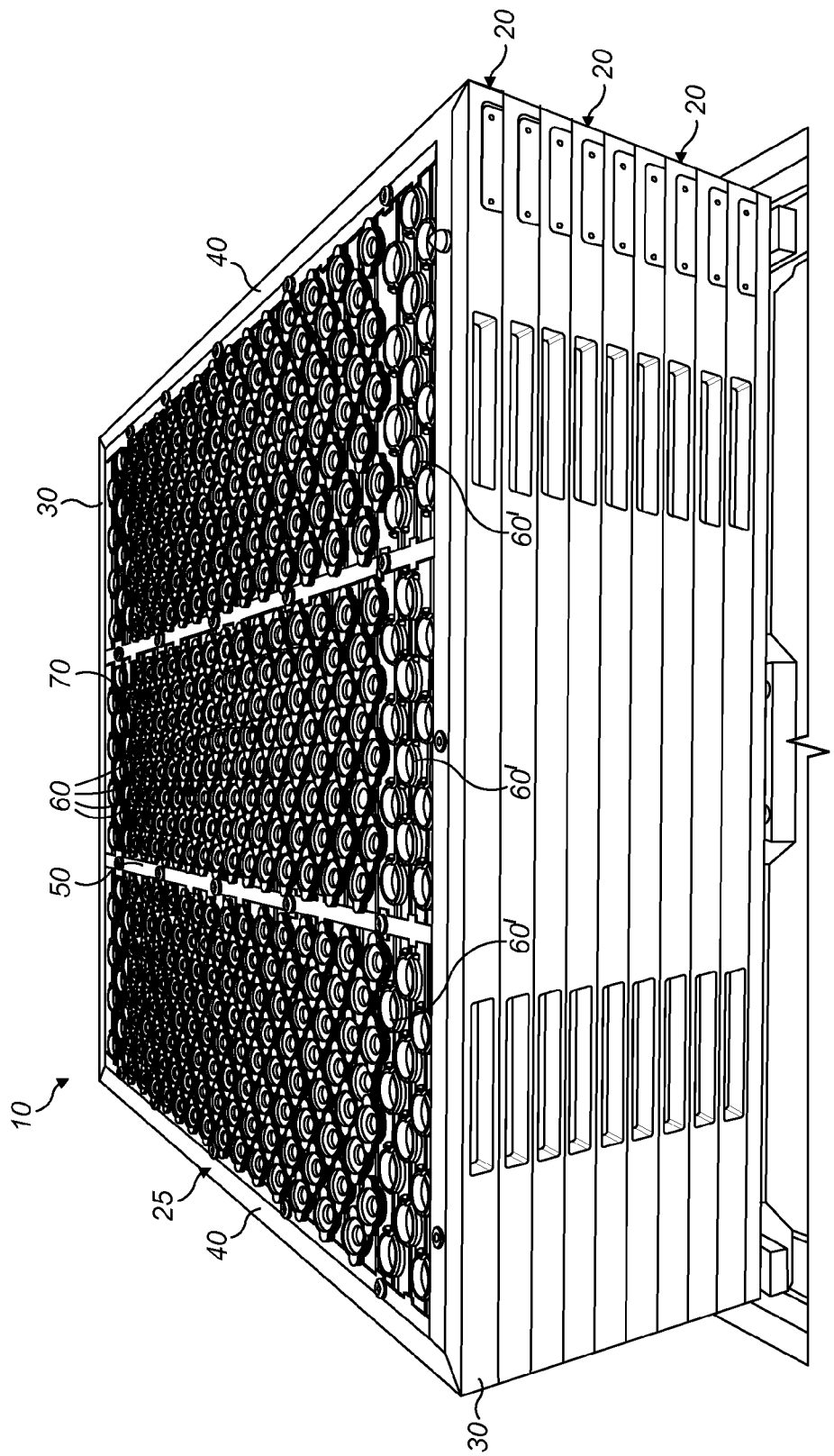
FIG. 1A, FIG. 1B, and FIG. 1C is a stack of trays according to an example embodiment, FIG. 1A in a perspective view towards the front of the stack, FIG. 1B in a top view showing contact lens molds in place on the top tray, and FIG. 1C in a side view.

Embodiments are described herein in the context of approaches to improve efficiency of lens manufacturing in manufacturing approaches employing thermal curing of a contact lens precursor material in an oven to form contact lenses.

Those of ordinary skill in the art will realize that the following detailed description is illustrative only and is not intended to be in any way limiting. Other embodiments of the present invention will readily suggest themselves to such skilled persons having the benefit of this disclosure. Reference will be made in detail to implementations as illustrated in the accompanying drawings. The same reference indicators will be used throughout the drawings and the following detailed description to refer to the same or like parts.

As previously stated, a first aspect is directed to a tray for holding contact lens mold assemblies during thermal curing of a contact lens precursor material in an oven to form contact lenses. The tray comprises a plurality of plates and a frame supporting the plates, the frame being configured to co-operate with identical frames so that a plurality of the trays can be stacked vertically to form a tray stack. Each plate comprises a plurality of support structures each arranged to support one contact lens mold assembly during curing, and a plurality of channels connecting the support structures, to allow fluid communication between the support structures in the tray stack during curing. Each plate is a carbon-fiber reinforced polymer plate.

A high packing density can be achieved with carbon-fibre reinforced polymer plates, carried in stackable trays, whilst still achieving a good thermal performance. Using a tray of carbon-fibre reinforced polymer improves heating performance during curing, as the material has a high thermal conductivity (and hence may distribute heat quickly) and has a low thermal mass (and hence may require less energy to heat to a given temperature). Advantageously, a desired temperature can be reached much more quickly and more uniformly than would be the case for an equivalent structure made of, say, steel. Thus, it has been found that, in a curing oven, the temperature of a contact lens mold assemblies in a stack of the trays can be increased rapidly and uniformly across the stack.

Furthermore, the carbon-fibre reinforced polymer tray is formed into a shape that advantageously improves gas flow in the curing oven. Improving the gas flow may further improve the speed and uniformity of heating of the mold assemblies throughout the stack.

Use of carbon-fibre reinforced polymer to form the tray advantageously enables a lower-cost manufacturing process compared with using steel. Compared with steel, using carbon-fibre reinforced polymer may reduce the weight of material to be heated by, for example, about 80 kg for a stack of nine trays.

Use of a carbon-fibre reinforced polymer advantageously also results in the plates being rigid, with low distortion when heated. Distortion is advantageously further reduced by using a plurality of plates supported in a frame. If a single, large tray were used, any distortion would have a relatively large effect on the positions of the edges of the tray. In contrast, by using a plurality of plates in a frame, any distortions in individual plates may be confined to those plates, rather than being transmitted to the whole tray. Additionally, molding a smaller plate requires a smaller mold tool, and hence can be done using lower cost equipment than would be required for a larger plate.

The carbon-fibre reinforced polymer may for example be a carbon-fibre reinforced polyamide, for example an aliphatic polyamide (nylon), or a carbon-fibre reinforced polyarylamide. The carbon-fibre reinforced polymer may have 25% to 35% carbon fibre.

The tray may comprise a plurality of plates, in which each of the plurality of plates is joined horizontally with at least one other of the plurality of plates to form an extended plate.

Each of the plurality of plates may comprise a first edge and a second edge, the first edge including projections that are complementary to projections on the second edge, so that two or more of the plurality of plates can be joined together to form the extended plate.

The plates may be rectangular.

The plates may, for example, support more than 25 mold assemblies per plate. The plates may support fewer than 35 mold assemblies per plate.

The support structure may be configured to support the mold assemblies in a raised position, i.e. above the plane of the plate. Raising the mold assembly above the plate can improve gas flow around the mold assembly and hence heat distribution in the stack. The support structure may comprise walls configured to support the mold assemblies in the raised position.

The plate may include a plurality of holes, with each hole positioned under the location of a mold assembly during use. Provision of a hole in the tray under the mold assembly can improve gas flow around the mold assembly and hence heat distribution in the stack. The support structures may be arranged around the holes. Each hole may have at its periphery a support structure, which may surround or substantially surround the hole. For example the support structure may extend around at least 60% of the periphery of the hole it surrounds. Each hole may be round with a support structure in the form of one or more arcuate support wall portions around its periphery.

The holes may be arranged on a square lattice. The lattice may have a pitch of 25 mm to 30 mm. The plate may be a rectangular plate and the square lattice may be oriented at an angle, for example 45 degrees, to the edges of the plate.

The channels may be provided on both top and bottom surfaces of the plate.

The channels may provide, in use, a continuous path for fluid across the plate. The channels may be arranged to provide fluid communication between adjacent holes in the plate. The channels may be formed through a support wall around the hole.

It may be that each tray has support structures for more than 25 mold assemblies per plate. It may be that each tray has support structures for fewer than 35 mold assemblies per plate.

Each mold assembly may have peripheral tabs. The plate may be provided with a locating member, e.g. pins arranged to prevent rotation of the tabs, and hence of the mold assembly, when the mold assembly is supported by the support structure.

The frame may be rectangular. The frame may include one or more alignment devices, e.g. pins and corresponding holes, to ensure correct alignment of the frame with at least one frame immediately above or below it in the tray stack. The frame may include crossbars. The crossbars may at least partially support the plates. The crossbars may separate the plates or the extended plates and thereby provide a fluid communication path in the tray stack.

The second aspect provides a stack of the trays according to the first aspect, including a plurality of the contact lens mold assemblies. The stack may be a stack of 3 to 15 trays, for example 6 to 12 trays, for example 9 trays.

Advantageously, mold assemblies do not extend to all of the edges of the tray. For example if, in use, a fluid such as air or another gas is to be directed across the tray (i.e. in a direction substantially parallel to the front and rear edges) then advantageously the mold assemblies do not extend to the front or rear edges of the tray. If, in use, a fluid such as air or another gas is to be directed along the tray (i.e. in a direction substantially perpendicular to the front and rear edges) then advantageously the mold assemblies do not extend to the left or right edges of the tray. For example, it may be that the outermost 5% of the front and rear, or left and right, of each tray does not hold mold assemblies. The outermost 5% of each tray may include spacer elements or, if support structures extend into the outermost 5% of each tray, they may be left empty in use. Thus, it may be that the trays hold fewer mold assemblies than there are support structures in the stack. It may be that support structures adjacent to the outer perimeter of the frame do not carry mold assemblies. Thus, the stack may be loaded with mold assemblies on all of the support structures except for those adjacent to the front and rear, or left and right, perimeter edges of the frame. It has been found that leaving a small number (e.g. 1 to 3) rows of support structures free of mold assemblies improves fluid flow around the tray stack.

It may be that the stack holds more than 3000 contact lens mold assemblies. It may be that the stack holds fewer than 4000 mold assemblies. It may be that the stack holds between 3400 and 3500 mold assemblies.

The third aspect provides a plate for use in a tray according to the first aspect, the plate being a carbon-fiber reinforced polymer plate and comprising:

(i) a plurality of support structures each arranged to support one contact lens mold assembly during curing; and (ii) a plurality of channels connecting the support structures, to allow fluid communication between the support structures in the tray stack during curing.

Figure 5:
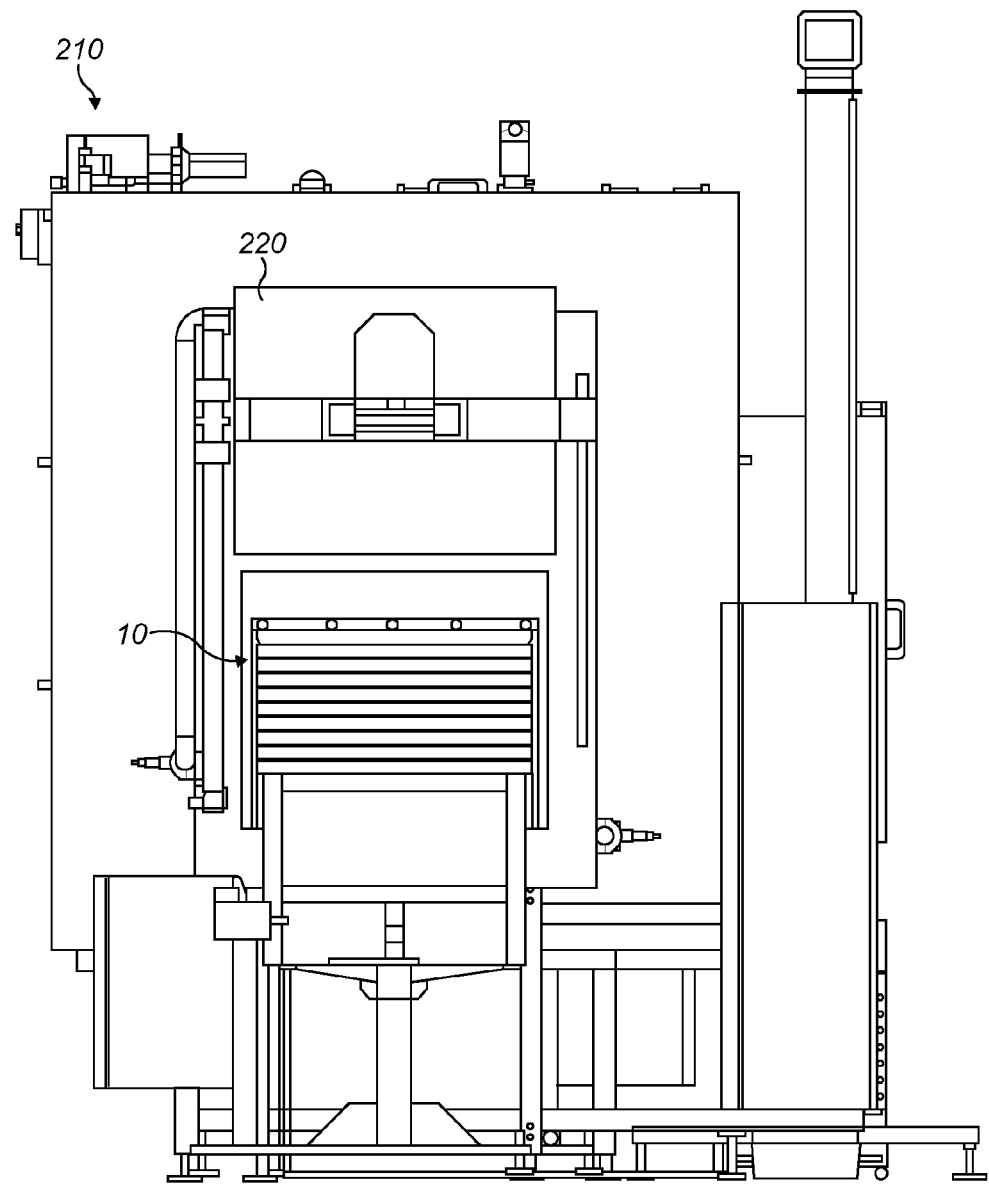
FIG. 5 is an end view of an oven for curing contact lenses.

With reference to the drawings, in an example stack 10 of nine rectangular trays 20 (FIGS. 1A-1C), each tray 20 has front and rear baffle bars 30, which run perpendicular to the direction in which the stack 10 passes through a curing oven 210. (In FIG. 5, a stack 10 is shown entering the oven 210, which has its access door 220 open.) The front and rear baffle bars 30 are joined by left and right outer plate-support struts 40 (FIGS. 1A-C and 2), which, together with the front and rear baffle bars 30, form the outer perimeter of the tray 20, and by two central plate-support struts 50. Thus, the plate-support struts 40, 50 and front and rear baffle bars 30 form a frame. The plate-support struts 40, 50, together with the front and rear baffle bars 30, support twelve whole plates 60 (largely hidden by the contact lens mold assemblies in FIG. 1A), and six half plates 60'. Between the left outer plate-support strut 40 and a first (leftmost) of the central plate-support struts 50 there is a first half plate 60', adjacent to the front baffle bar, then four whole plates 60, then a second half plate 60'. There is the same arrangement of plates 60 between the central plate-support struts 50, and also between the second (rightmost) of the central plate-support struts 50 and the right outer plate-support strut 40. Each whole plate 60 carries 32 contact lens mold assemblies 70. The half plates 60' do not carry contact lenses but rather are left empty. It has been found that leaving those half plates empty improves circulation of gas in the oven 210 (in this example, gas flows substantially transversely to the movement of the stack 10 in the oven 210, i.e. parallel to the front and rear baffle bars 30). Each lens mold assembly 70 has two projecting flanges 75.

Figure 1B:
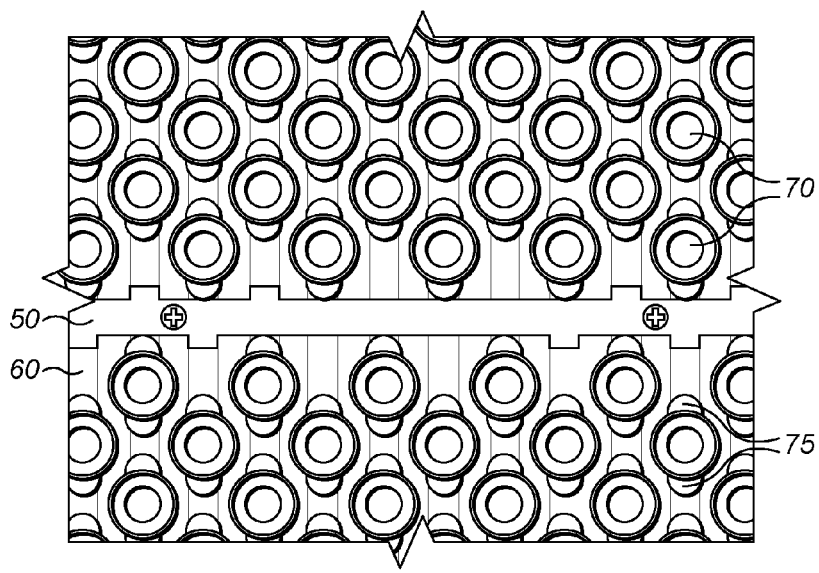
Figure 1C:
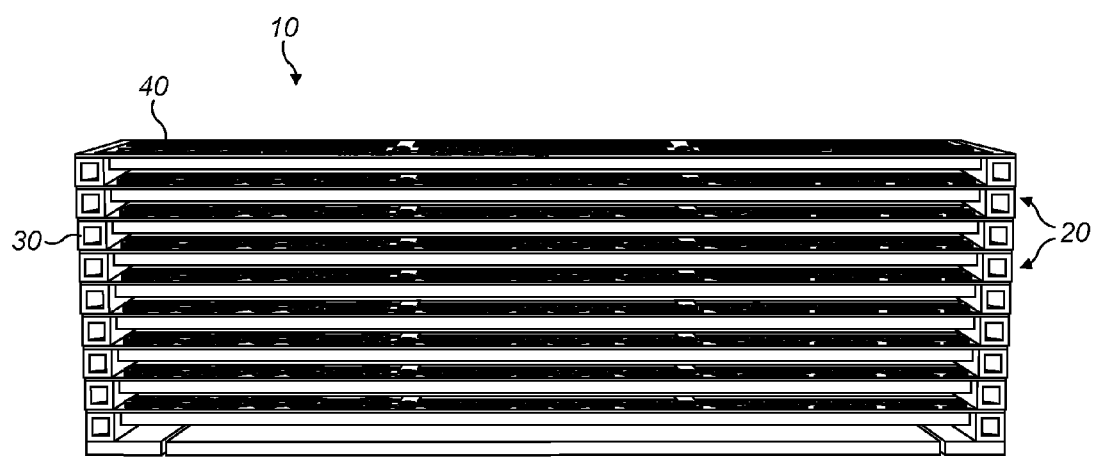
Figure 2:
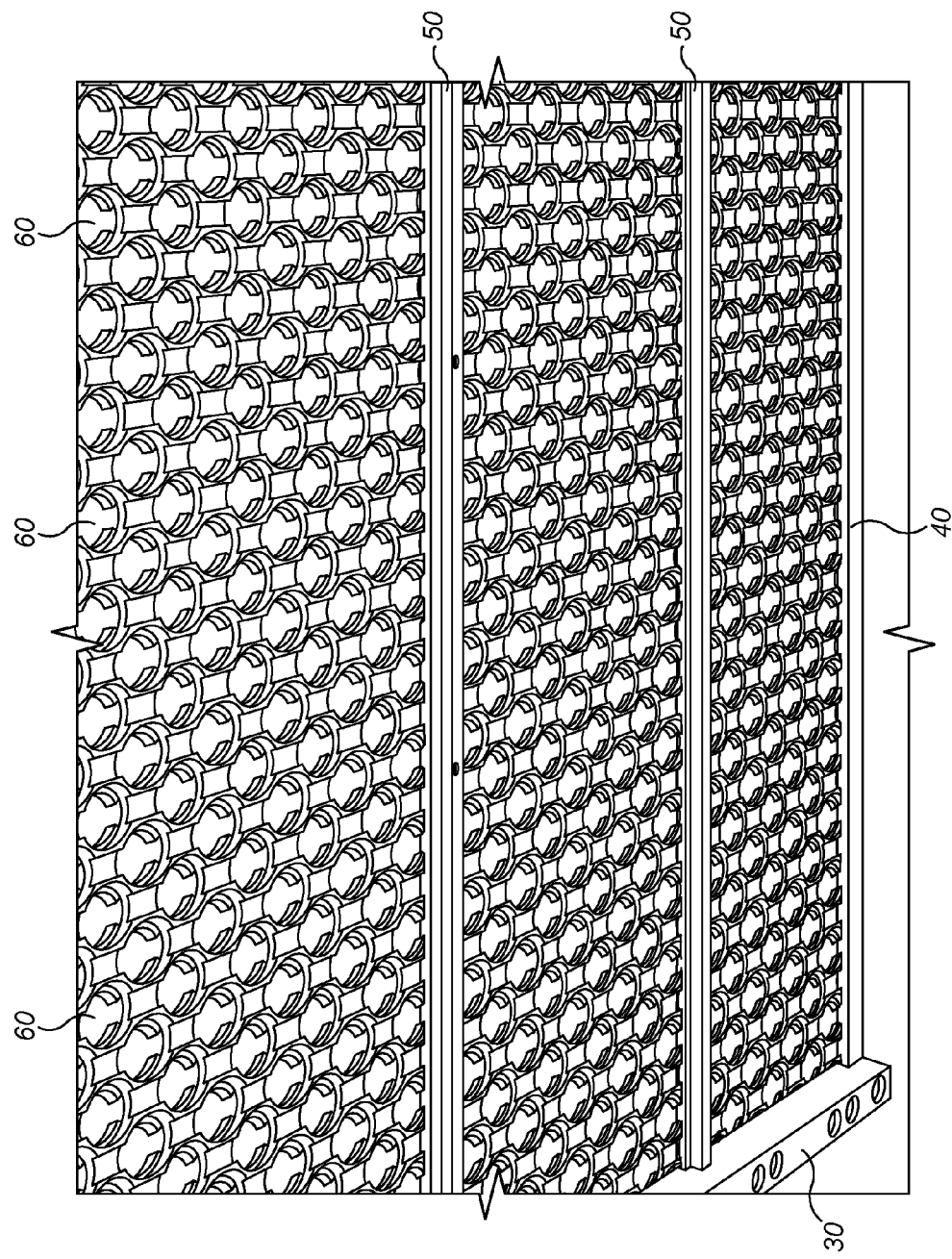
FIG. 2 is a perspective view towards the bottom face of the top tray of the stack of FIG. 1.

As can be seen most clearly in FIG. 1C, the baffle bars 30 are hollow tubes of approximately square cross-section. As can be seen in FIG. 1A as well as FIG. 1C, when the nine trays 20 are stacked, the baffle bars 30 of each successive tray 20 in the stack 10 are in contact with each other, forming front and rear baffles, with a tray-to-tray pitch of 25 mm. In use, the stack 10 is conveyed into the curing oven 210 and, when the stack 10 is in the curing oven 210, the front and rear baffles act as zone walls in the oven 210, enabling the formation of a plurality of curing zones in the oven 210, in the manner described in WO2008/144427 A1 (CooperVision International Holding Company, LP).

The plate-support struts 40, 50 are "+" shaped in cross section (FIG. 2), providing ledges on which the plates 60 are supported. In contrast to the baffle bars 30, the plate-support struts 40, 50 of successive trays 20 in the stack 10 are not in contact (FIG. 1C); rather between successive plate-support struts 40, 50 there is a gap of height approximately equal to the height of the struts 40, 50 themselves. Consequently, the mold assemblies 70 carried by plates 60 in successive trays 20 in the stack 10 are spaced apart from each other, allowing gas to circulate through the stack 10 in use in the oven 210.

Figure 3A:
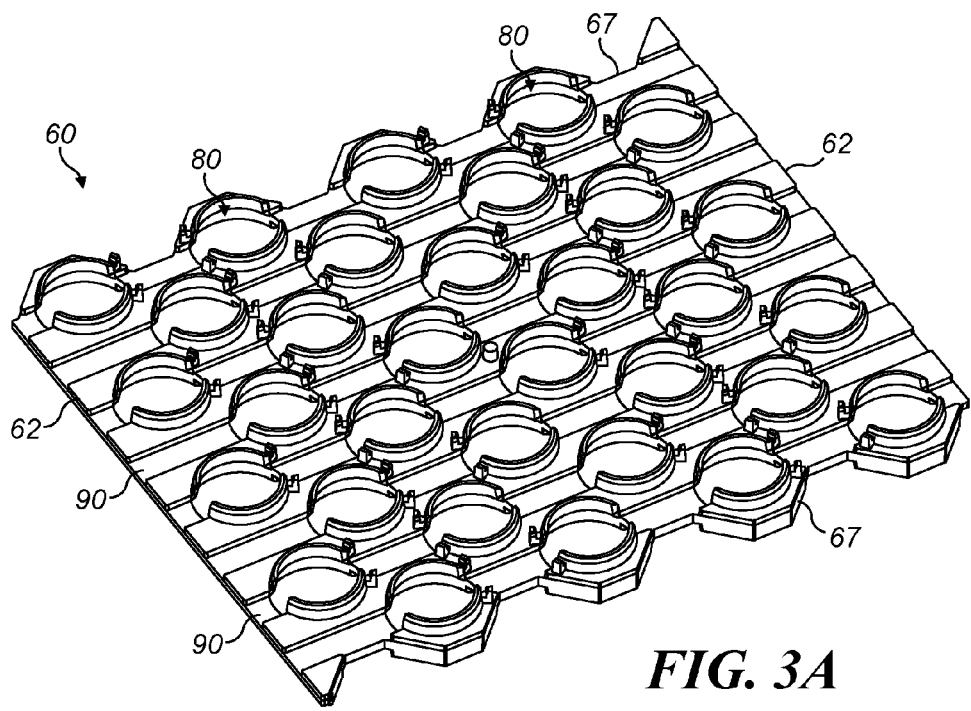
FIG. 3A and FIG. 3B is a plate according to an example embodiment, in a perspective view towards FIG. 3A the top face and FIG. 3B the bottom face of the plate.
Figure 3B:
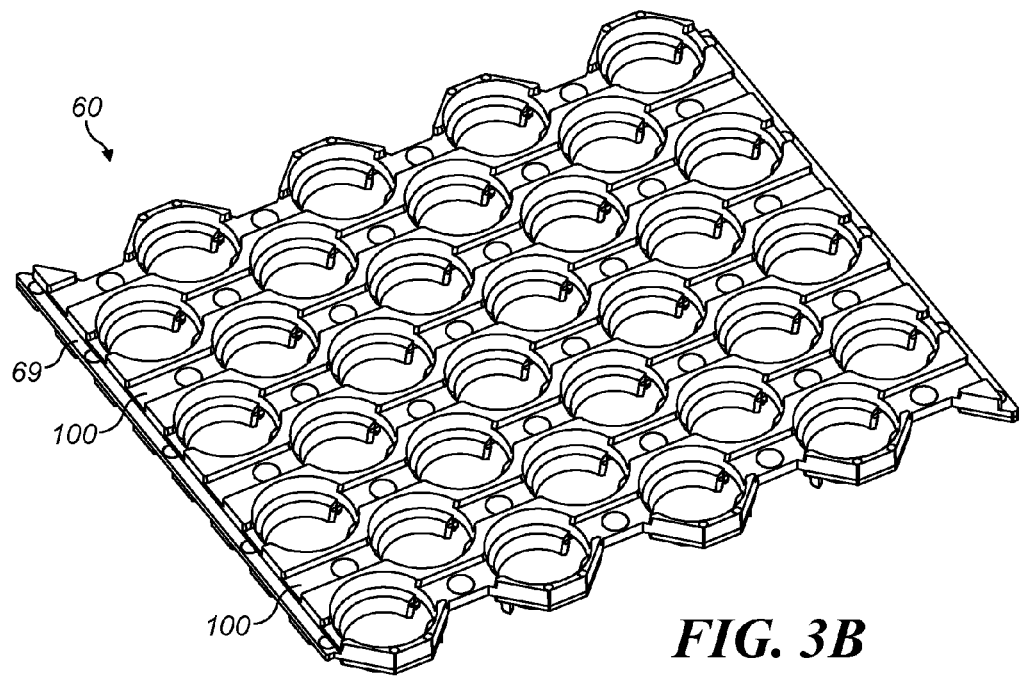

One of the plates 60 is shown in FIGS. 3A and 3B. The plate has a length of 183 mm (straight edge to straight edge) and a width of 170 mm (between corresponding points on the protrusions or recesses on each edge). The plate thickness is 6.3 mm.

The plate 60 has opposing straight left and right edges 62, which rest on the plate-support struts 40, 50 when the plate 60 is in the tray 20. The plate 60 has opposing front and rear edges 67 with protrusions and recesses that are complementary on opposite sides of the plate 60, so that the plate 60 can interlock with an adjacent identical plate 60 to form a continuous larger plate. The protrusions and recesses form a periodic structure having a unit cell consisting of a protruding end perpendicular to the straight edges 62 of the plate 60, an angled side portion, a recessed end perpendicular to the straight edges 62 of the plate 60 and another angled side portion. Each protruding or recessed end is about 10 mm in length, and each angled side portion is about 13 mm in length. The protruding ends extend about 10 mm from the end of each recess, in a direction parallel to the straight edges 62 of the plate 60. Adjustable pads (not visible in the drawings) are provided between the plates 60 in the tray, and can be adjusted to ensure a good fit.

The plate 60 is perforated by an array of thirty-two holes 80, on a square lattice arranged diagonally (at 45 degrees) on the plate 60 and having a pitch of about 28 mm. The holes 80 are arranged so that the pitch is approximately the same in the left-right and front-back directions on the plate 60. The holes 80 are substantially circular. On the bottom side of the plate 60, each hole 80 has a width of 23.5 mm in the direction between the straight edges 62 and a width of 25 mm in the perpendicular direction. On the top side of the plate 60, each hole 80 has the same 23.5 width in the direction between the straight edges 62 and a width of 18.2 mm, in the perpendicular direction (at the top of the circumferential walls 110).

The plate 60 has eight channels 90 running across its upper surface and eight channels 100 running across its lower surface. The channels 90 on the upper surface are in register with the channels 100 on the lower surface. The channels 90, 100 run perpendicular to the straight edges. The channels 90, 100 have been found to improve flow of gas to the holes 80 during use in the oven 210.

The channels 90, 100 have a width of 9.8 mm, and the regions between the channels each has a width of 10.3 mm. The channels on the top of the plate have a depth of 1.5 mm. the channels on the bottom of the tray portion have a depth of 2 mm. The remaining thickness of the plate in the channels is 2.9 mm.

On each straight edge 62, there is also, on the underside of the plate 60, a marginal channel 69, running along the whole length of the tray. The marginal channel 69 engages with the plate-support struts 40, 50. The marginal channel 69 has a width of 3 mm and a depth of 3.1 mm relative to the full thickness of the plate 60.

Figure 4A:
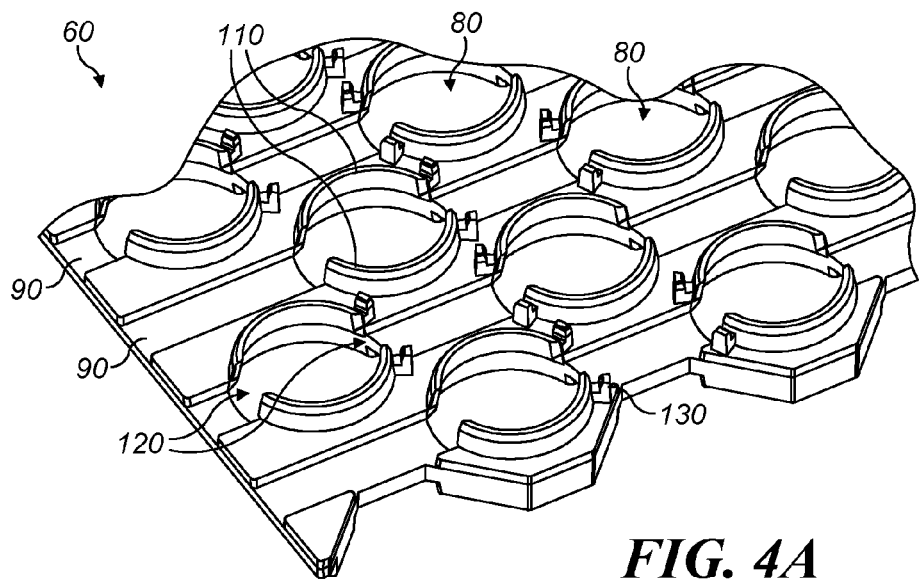
FIG. 4A and FIG. 4B is a portion of the plate of FIGS. 3A-3B, shown in more detail in a perspective view towards FIG. 4A the top face and FIG. 4B the bottom face of the plate.
Figure 4B:
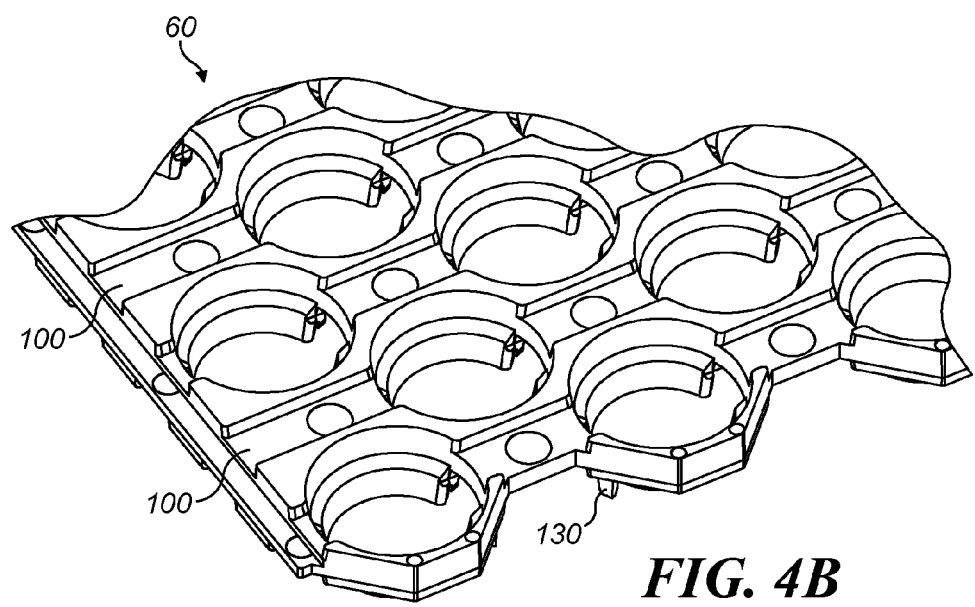

The structure of the plate 60 in the vicinity of the holes 80 is shown in more detail in FIGS. 4A-4B. Each hole 80 has a support structure in the form of a circumferential support wall 110, formed in two portions split by two gaps 120. The support wall 110 supports a contact lens mold assembly 70 (not shown in FIGS. 4A-4B) above the hole 80, raising the mold assembly 70 above the level of the plate and thereby improving the flow of gas around it during curing in the oven 210, breaking up laminar flow and creating turbulence.

The two gaps 120 correspond to the positions at which the channel 90 on the upper surface of the plate 60 crosses the hole 80. Thus, the support wall 110 surrounds the hole 80 except for where the channels 90, 100 runs across the plate 60 in line with the hole 80, where there is a corresponding gap 120 in the support wall 110. At the gaps 120, the ends of the portions of the support wall 110 on opposite sides of each hole 80 are separated by 8.2 mm. Each support wall 110 has a thickness of 1.3 mm. The maximum tray thickness, corresponding to the top of the support walls 110, is 9.9 mm.

Adjacent to the gaps 120, the plate 60 has two pins 130. The pins 130 act to retain projecting flanges 75 on the mold assembly 70 and thereby prevent the mold assembly 70 from rotating on the plate 60. The holes 80 form pairs along the channels 90, 100 running across the plate 60, with one hole of the pair having its pins 130 adjacent to the gap 120 closest to the left-hand straight edge 62, and the other hole of the pair having its pins 130 adjacent to the gap closest to the right-hand straight edges 62. Thus, the pins 130 of neighboring holes 80 (neighboring in the direction of the channels 90, 100 running across the plate 60) are facing each other.

We have found that, in use in the oven 210, mold assemblies carried in the stack 10 on plates 60 in trays 20 reach 65 degrees Celsius in 2 to 2.5 minutes. All mold assemblies in the stack 10 are at a temperature that is within 5 degrees of the nominal set-point temperature of the oven. With 17 trays, each of 384 mold assemblies in the oven 210 at a given time, the oven 210 is capable of producing up to 19200 mold assemblies per hour.

While the present invention has been described and illustrated with reference to particular embodiments, it will be appreciated by those of ordinary skill in the art that the disclosure lends itself to many different variations not specifically illustrated herein.

Where, in the foregoing description, integers or elements are mentioned that have known, obvious, or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional do not limit the scope of the independent claims. Moreover, it is to be understood that such optional integers or features, while of possible benefit in some embodiments of the invention, may not be desirable, and can therefore be absent, in other embodiments.

The invention claimed is:

1. A tray for holding contact lens mold assemblies during thermal curing of a contact lens precursor material in an oven to form contact lenses, wherein the tray comprises:
   (a) a plurality of plates; and
   (b) a frame supporting the plates, the frame being configured to co-operate with identical frames so that a plurality of the trays can be stacked vertically to form a tray stack;
   wherein each plate comprises:
   (i) a plurality of support structures each arranged to support one contact lens mold assembly during curing; and
   (ii) a plurality of channels connecting the support structures, to allow fluid communication between the support structures in the tray stack during curing;
   and wherein each plate is a carbon-fiber reinforced polymer plate.

2. A tray as claimed in claim 1, in which the carbon-fibre reinforced polymer is carbon-fibre reinforced polyamide or polyarylamide.

3. A tray as claimed in claim 1, in which the carbon-fibre reinforced polymer is 25% to 35% carbon fibre.

4. A tray as claimed in claim 1, comprising a plurality of plates in which each of the plurality of plates is joined horizontally with at least one other of the plurality of plates to form an extended plate.

5. A tray as claimed in claim 4, wherein each of the plurality of plates comprises a first edge and a second edge, the first edge including projections that are complementary to projections on the second edge, so that two or more of the plurality of plates can be joined together to form the extended plate.

6. A tray as claimed in claim 1, in which the support structure is configured to support the mold assemblies in a raised position.

7. A tray as claimed in claim 6, in which the support structure comprises walls configured to support the mold assemblies in the raised position.

8. A tray as claimed in claim 1, in which the plate includes a plurality of holes, with each hole positioned under the location of a mold assembly during use.

9. A tray as claimed in claim 8, in which each hole has at its periphery a support structure, which may surround or substantially surround the hole.

10. A tray as claimed in claim 9, in which each hole is round with a support structure in the form of one or more arcuate support walls around its periphery.

11. A tray as claimed in claim 1, in which the channels are arranged to provide fluid communication between adjacent holes in the plate.

12. A tray as claimed in claim 1, including one or more alignment devices, to ensure correct alignment of the frame with at least one frame immediately above or below it in the tray stack.

13. A tray as claimed in claim 1, in which the frame includes crossbars that separate the plates and thereby provide a fluid communication path in the tray stack.

14. A stack of the trays as claimed in claim 1, including a plurality of the contact lens mold assemblies.

15. A stack as claimed in claim 14, loaded with mold assemblies on the support structures wherein mold assemblies do not extend to all of the edges of the tray.

16. A plate for use in a tray as claimed in claim 1, the plate being a carbon-fiber reinforced polymer plate and comprising:
   (i) a plurality of support structures each arranged to support one contact lens mold assembly during curing; and (ii) a plurality of channels connecting the support structures, to allow fluid communication between the support structures in the tray stack during curing.

\* \* \* \* \*